US010432937B2

United States Patent
Gervais et al.

(10) Patent No.: US 10,432,937 B2
(45) Date of Patent: Oct. 1, 2019

(54) ADAPTIVE PRECISION AND QUANTIFICATION OF A WAVELET TRANSFORMED MATRIX

(71) Applicant: Jean-Claude Colin, Versailles (FR)

(72) Inventors: Than Marc-Eric Gervais, Paris (FR); Bruno Loubet, Paris (FR); Nicolas Bessou, Sartrouvile (FR); Yves Guimiot, Conflans Saint Honorine (FR); Mickael Petitfils, Livry-Gargan (FR); Sebastien Roques, Paris (FR)

(73) Assignee: Jean-Claude Colin, Versailles (FR)

( * ) Notice: Subject to any disclaimer, the term of this patent is extended or adjusted under 35 U.S.C. 154(b) by 403 days.

(21) Appl. No.: 15/315,501

(22) PCT Filed: Jul. 9, 2015

(86) PCT No.: PCT/FR2015/000141
§ 371 (c)(1),
(2) Date: Dec. 1, 2016

(87) PCT Pub. No.: WO2015/185810
PCT Pub. Date: Dec. 10, 2015

(65) Prior Publication Data
US 2017/0195673 A1  Jul. 6, 2017

(30) Foreign Application Priority Data
Jun. 4, 2014 (FR) ..................... 14 01280

(51) Int. Cl.
*H04N 19/126* (2014.01)
*H04N 19/635* (2014.01)
(Continued)

(52) U.S. Cl.
CPC .......... *H04N 19/126* (2014.11); *H04N 19/18* (2014.11); *H04N 19/42* (2014.11); *H04N 19/635* (2014.11); *H04N 19/50* (2014.11)

(58) Field of Classification Search
None
See application file for complete search history.

(56) References Cited

U.S. PATENT DOCUMENTS

| | | | |
|---|---|---|---|
| 2006/0089960 A1* | 4/2006 | Hinds | G06F 17/147 708/490 |
| 2009/0175548 A1* | 7/2009 | Fukuhara | H04N 19/63 382/233 |
| 2011/0268182 A1* | 11/2011 | Joshi | H04N 19/647 375/240.03 |

OTHER PUBLICATIONS

Son et al.: "Low complexity embedded compression algorithm for reduction of memory size and bandwidth requirements in the JPEG2000 encoder", IEEE Transactions on Consumer Electronics, IEEE Service Center, New York, NY, US, vol. 56, No. 4, Nov. 1, 2010, pp. 2421-2429, XP011341842.

(Continued)

*Primary Examiner* — Bernard Krasnic
(74) *Attorney, Agent, or Firm* — Young & Thompson

(57) ABSTRACT

A method for reducing the entropy of an original matrix, includes a step using a wavelet transformation of the original matrix into a transformed matrix, a quantization coefficient corresponding to each wavelet level, the wavelet transformation being calculated in fixed decimal point using a first number of digits at least equal to 1, for example 3 digits, after the decimal point. Such a method is particularly advantageous for image compression.

26 Claims, 10 Drawing Sheets

(51) Int. Cl.
*H04N 19/42* (2014.01)
*H04N 19/18* (2014.01)
*H04N 19/50* (2014.01)

(56) References Cited

OTHER PUBLICATIONS

Christopoulos et al.: "The JPEG2000 Still Image Coding System: an Overview", IEEE Transactions on Consumer Electronics, IEEE Service Center, New York, NY, US, vol. 46, No. 4, Nov. 1, 2000, pp. 1103-1127, XP001059899.

* cited by examiner

Figure 2A

|  | x01 | x02 | x03 | x04 | x05 | x06 | x07 | x08 | X |
|---|---|---|---|---|---|---|---|---|---|
| x10 | x11 | x12 | x13 | x14 | x15 | x16 | x17 | x18 | x19 |
| x20 | x21 | x22 | x23 | x24 | x25 | x26 | x27 | x28 | x29 |
| x30 | x31 | x32 | x33 | x34 | x35 | x36 | x37 | x38 | x39 |
| x40 | x41 | x42 | x43 | x44 | x45 | x46 | x47 | x48 | x49 |
| x50 | x51 | x52 | x53 | x54 | x55 | x56 | x57 | x58 | x59 |
| x60 | x61 | x62 | x63 | x64 | x65 | x66 | x67 | x68 | x69 |
| x70 | x71 | x72 | x73 | x74 | x75 | x76 | x77 | x78 | x79 |
| x80 | x81 | x82 | x83 | x84 | x85 | x86 | x87 | x88 | x89 |
|  | x91 | x92 | x93 | x94 | x95 | x96 | x97 | x98 |  |

Figure 3A

|  | L01 | L02 | L03 | L04 | L05 | L06 | L07 | L08 | LZ |
|---|---|---|---|---|---|---|---|---|---|
| L10 | L11 | L12 | L13 | L14 | L15 | L16 | L17 | L18 | L19 |
| L20 | L21 | L22 | L23 | L24 | L25 | L26 | L27 | L28 | L29 |
| L30 | L31 | L32 | L33 | L34 | L35 | L36 | L37 | L38 | L39 |
| L40 | L41 | L42 | L43 | L44 | L45 | L46 | L47 | L48 | L49 |
|  | L51 | L52 | L53 | L54 | L55 | L56 | L57 | L58 |  |

|  | H01 | H02 | H03 | H04 | H05 | H06 | H07 | H08 | HZ |
|---|---|---|---|---|---|---|---|---|---|
| H10 | H11 | H12 | H13 | H14 | H15 | H16 | H17 | H18 | H19 |
| H20 | H21 | H22 | H23 | H24 | H25 | H26 | H27 | H28 | H29 |
| H30 | H31 | H32 | H33 | H34 | H35 | H36 | H37 | H38 | H39 |
| H40 | H41 | H42 | H43 | H44 | H45 | H46 | H47 | H48 | H49 |
|  | H51 | H52 | H53 | H54 | H55 | H56 | H57 | H58 |  |

Figure 4A

|  | LL01 | LL02 | LL03 | LL04 | LL |
|---|---|---|---|---|---|
| LL10 | LL11 | LL12 | LL13 | LL14 | LL15 |
| LL20 | LL21 | LL22 | LL23 | LL24 | LL25 |
| LL30 | LL31 | LL32 | LL33 | LL34 | LL35 |
| LL40 | LL41 | LL42 | LL43 | LL44 | LL45 |
|  | LL51 | LL52 | LL53 | LL54 |  |

|  | LH01 | LH02 | LH03 | LH04 | LH |
|---|---|---|---|---|---|
| LH10 | LH11 | LH12 | LH13 | LH14 | LH15 |
| LH20 | LH21 | LH22 | LH23 | LH24 | LH25 |
| LH30 | LH31 | LH32 | LH33 | LH34 | LH35 |
| LH40 | LH41 | LH42 | LH43 | LH44 | LH45 |
|  | LH51 | LH52 | LH53 | LH54 |  |

|  | HL01 | HL02 | HL03 | HL04 | HL |
|---|---|---|---|---|---|
| HL10 | HL11 | HL12 | HL13 | HL14 | HL15 |
| HL20 | HL21 | HL22 | HL23 | HL24 | HL25 |
| HL30 | HL31 | HL32 | HL33 | HL34 | HL35 |
| HL40 | HL41 | HL42 | HL43 | HL44 | HL45 |
|  | LH51 | LH52 | LH53 | LH54 |  |

|  | HH01 | HH02 | HH03 | HH04 | HH |
|---|---|---|---|---|---|
| HH10 | HH11 | HH12 | HH13 | HH14 | HH15 |
| HH20 | HH21 | HH22 | HH23 | HH24 | HH25 |
| HH30 | HH31 | HH32 | HH33 | HH34 | HH35 |
| HH40 | HH41 | HH42 | HH43 | HH44 | HH45 |
|  | HH51 | HH52 | HH53 | HH54 |  |

Figure 2B

| | 0 | 0 | 0 | 0 | 0 | 0 | 0 | 0 | X |
|---|---|---|---|---|---|---|---|---|---|
| 0 | 116 | 110 | 72 | 59 | 102 | 179 | 224 | 127 | 224 |
| 0 | 121 | 108 | 59 | 144 | 163 | 149 | 95 | 25 | 95 |
| 0 | 110 | 117 | 159 | 145 | 78 | 69 | 46 | 47 | 46 |
| 0 | 115 | 123 | 147 | 123 | 98 | 75 | 47 | 80 | 47 |
| 0 | 126 | 141 | 127 | 93 | 77 | 50 | 74 | 97 | 74 |
| 0 | 119 | 111 | 91 | 82 | 77 | 79 | 73 | 81 | 73 |
| 0 | 125 | 124 | 81 | 101 | 111 | 82 | 52 | 66 | 52 |
| 0 | 141 | 102 | 65 | 116 | 86 | 57 | 83 | 105 | 83 |
| | 125 | 124 | 81 | 101 | 111 | 82 | 52 | 66 | |

Figure 3B

| | 0 | 0 | 0 | 0 | 0 | 0 | 0 | 0 | L1Z |
|---|---|---|---|---|---|---|---|---|---|
| 0 | 118 | 109 | 58 | 70 | 120 | 185 | 214 | 112 | 214 |
| 0 | 111 | 114 | 146 | 157 | 102 | 79 | 33 | 34 | 33 |
| 0 | 124 | 134 | 125 | 90 | 78 | 57 | 73 | 99 | 73 |
| 0 | 127 | 113 | 74 | 101 | 101 | 79 | 62 | 76 | 62 |
| | 124 | 134 | 125 | 90 | 78 | 57 | 73 | 99 | |

| | 0 | 0 | 0 | 0 | 0 | 0 | 0 | 0 | H1Z |
|---|---|---|---|---|---|---|---|---|---|
| 0 | 8 | -6 | -57 | 42 | 73 | 25 | -40 | -62 | -40 |
| 0 | -3 | -6 | 4 | 4 | 21 | 16 | -13 | 8 | -13 |
| 0 | -7 | -22 | -13 | -15 | -17 | 13 | 10 | -1 | 10 |
| 0 | 16 | -22 | -16 | 15 | -25 | -25 | 31 | 39 | 31 |
| | -7 | -22 | -13 | -15 | -17 | 13 | 10 | -1 | |

Figure 4B

| | 0 | 0 | 0 | 0 | LL1Z |
|---|---|---|---|---|---|
| 0 | 123 | 59 | 120 | 193 | 120 |
| 0 | 107 | 151 | 113 | 36 | 113 |
| 0 | 127 | 125 | 70 | 75 | 70 |
| 0 | 130 | 81 | 104 | 65 | 104 |
| | 127 | 125 | 70 | 75 | |

| | 0 | 0 | 0 | 0 | LH1Z |
|---|---|---|---|---|---|
| 0 | 21 | -19 | 18 | -102 | 18 |
| 0 | -15 | 33 | 12 | 1 | 12 |
| 0 | 10 | -12 | -19 | 26 | -19 |
| 0 | 13 | 14 | -3 | 14 | -3 |
| | 10 | -12 | -19 | 26 | |

| | 0 | 0 | 0 | 0 | HL1Z |
|---|---|---|---|---|---|
| 0 | 13 | -44 | 84 | -43 | 84 |
| 0 | -5 | 0 | 22 | -5 | 22 |
| 0 | -10 | -16 | -13 | 12 | -13 |
| 0 | 11 | -13 | -23 | 26 | -23 |
| | -10 | -16 | -13 | 12 | |

| | 0 | 0 | 0 | 0 | HH1Z |
|---|---|---|---|---|---|
| 0 | 19 | 34 | 9 | -22 | 9 |
| 0 | -7 | -9 | 12 | 21 | 12 |
| 0 | -12 | 0 | 17 | -11 | 17 |
| 0 | -22 | 36 | -28 | 8 | -28 |
| | -12 | 0 | 17 | -11 | |

|   |     |     |     |     |     |
|---|-----|-----|-----|-----|-----|
| 0 | 119 | 74  | 125 | 169 | 125 |
| 0 | 123 | 129 | 83  | 48  | 83  |
|   | 119 | 74  | 125 | 169 |     |

H2Z

|   |     |     |    |     |     |
|---|-----|-----|----|-----|-----|
| 0 | -18 | 59  | 18 | -98 | 18  |
| 0 | 3   | -44 | 34 | -10 | 34  |
|   | -18 | 59  | 18 | -98 |     |

|   |     |     |     |
|---|-----|-----|-----|
| 0 | 107 | 124 | 107 |
| 0 | 130 | 81  | 130 |
|   | 107 | 124 |     |

LH2Z

|   |     |     |     |
|---|-----|-----|-----|
| 0 | -48 | 44  | -48 |
| 0 | 26  | -35 | 26  |
|   | -48 | 44  |     |

HL2Z

|   |     |    |     |
|---|-----|----|-----|
| 0 | -3  | 4  | -3  |
| 0 | -13 | 7  | -13 |
|   | -3  | 4  |     |

HH2Z

|   |     |      |     |
|---|-----|------|-----|
| 0 | 59  | -116 | 59  |
| 0 | -63 | -44  | -63 |
|   | 59  | -116 |     |

| 107 | 124 |
|-----|-----|
| 130 | 81  |

LH2QZ

| -24 | 22  |
|-----|-----|
| 13  | -18 |

LH1QZ

| 5  | -5 | 5  | -26 |
|----|----|----|-----|
| -4 | 6  | 3  | 0   |
| 3  | -3 | -5 | 7   |
| 3  | 4  | -1 | 4   |

HL2QZ

| -2 | 2 |
|----|---|
| -7 | 4 |

HH2QZ

| 30  | -58 |
|-----|-----|
| -32 | -22 |

HL1QZ

| 3  | -11 | 21 | -11 |
|----|-----|----|-----|
| -1 | 0   | 6  | -1  |
| -3 | -4  | -3 | 3   |
| 3  | -3  | -6 | 7   |

HH1QZ

| 5  | 9  | 2  | -6 |
|----|----|----|----|
| -2 | -2 | 3  | 5  |
| -3 | 0  | 4  | -3 |
| -6 | 9  | -7 | 2  |

| 107 | 124 | -24 | 22  | 5  | -5 | 5  | -26 |
|-----|-----|-----|-----|----|----|----|-----|
| 130 | 81  | 13  | -18 | -4 | 8  | 3  | 0   |
| -2  | 2   | 30  | -58 | 3  | -3 | -5 | 7   |
| -7  | 4   | -32 | -22 | 3  | 4  | -1 | 4   |
| 3   | -11 | 21  | -11 | 5  | 9  | 2  | -6  |
| -1  | 0   | 6   | -1  | -2 | -2 | 3  | 5   |
| -3  | -4  | -3  | 3   | -3 | 0  | 4  | -3  |
| 3   | -3  | -6  | 7   | -6 | 9  | -7 | 2   |

|   | 0 | 0 | 0 | 0 | 0 | 0 | 0 | 0 | L1RZ |
|---|---|---|---|---|---|---|---|---|------|
| 0 | 119 | 109 | 59 | 70 | 121 | 186 | 215 | 111 | 215 |
| 0 | 111 | 114 | 149 | 158 | 103 | 81 | 34 | 34 | 34 |
| 0 | 125 | 138 | 127 | 91 | 79 | 56 | 73 | 101 | 73 |
| 0 | 127 | 113 | 74 | 105 | 103 | 79 | 63 | 79 | 63 |
|   | 125 | 138 | 127 | 91 | 79 | 56 | 73 | 101 |   |

|   | 0 | 0 | 0 | 0 | 0 | 0 | 0 | 0 | H1RZ |
|---|---|---|---|---|---|---|---|---|------|
| 0 | 7 | -6 | -58 | 44 | 73 | 25 | -40 | -64 | -40 |
| 0 | -2 | -7 | 4 | 6 | 23 | 18 | -12 | 8 | -12 |
| 0 | -9 | -23 | -13 | -15 | -16 | 14 | 11 | -1 | 11 |
| 0 | 18 | -23 | -15 | 16 | -26 | -25 | 33 | 41 | 33 |
|   | -9 | -23 | -13 | -15 | -16 | 14 | 11 | -1 |   |

Figure 13B

|   | 0 | 0 | 0 | 0 | 0 | 0 | 0 | 0 | XRZ |
|---|---|---|---|---|---|---|---|---|-----|
| 0 | 117 | 111 | 74 | 59 | 103 | 182 | 225 | 127 | 225 |
| 0 | 121 | 108 | 61 | 147 | 164 | 151 | 96 | 24 | 96 |
| 0 | 110 | 117 | 163 | 146 | 79 | 70 | 47 | 48 | 47 |
| 0 | 117 | 125 | 150 | 126 | 101 | 77 | 48 | 82 | 48 |
| 0 | 128 | 146 | 129 | 93 | 77 | 48 | 73 | 99 | 73 |
| 0 | 118 | 113 | 92 | 84 | 80 | 79 | 74 | 83 | 74 |
| 0 | 125 | 125 | 81 | 105 | 114 | 82 | 52 | 69 | 52 |
| 0 | 143 | 102 | 66 | 121 | 88 | 57 | 85 | 110 | 85 |
|   | 125 | 125 | 81 | 105 | 114 | 82 | 52 | 69 |   |

| 1 | 1 | 2 | 0 | 1 | 3 | 1 | 0 |
|---|---|---|---|---|---|---|---|
| 0 | 0 | 2 | 3 | 1 | 2 | 1 | 1 |
| 0 | 0 | 4 | 1 | 1 | 1 | 1 | 1 |
| 2 | 2 | 3 | 3 | 3 | 2 | 1 | 2 |
| 2 | 5 | 2 | 0 | 0 | 2 | 1 | 2 |
| 1 | 2 | 1 | 2 | 3 | 0 | 1 | 2 |
| 0 | 1 | 0 | 4 | 3 | 0 | 0 | 3 |
| 2 | 0 | 1 | 5 | 2 | 0 | 2 | 5 |

Figure 2C

| | 0 | 0 | 0 | 0 | 0 | 0 | 0 | 0 | XD |
|---|---|---|---|---|---|---|---|---|---|
| 0 | 928 | 880 | 576 | 472 | 816 | 1432 | 1792 | 1016 | 1792 |
| 0 | 968 | 864 | 472 | 1152 | 1304 | 1192 | 760 | 200 | 760 |
| 0 | 880 | 936 | 1272 | 1160 | 624 | 552 | 368 | 376 | 368 |
| 0 | 920 | 984 | 1176 | 984 | 784 | 600 | 376 | 640 | 376 |
| 0 | 1008 | 1128 | 1016 | 744 | 616 | 400 | 592 | 776 | 592 |
| 0 | 952 | 888 | 728 | 656 | 616 | 632 | 584 | 648 | 584 |
| 0 | 1000 | 992 | 648 | 808 | 888 | 656 | 416 | 528 | 416 |
| 0 | 1128 | 816 | 520 | 928 | 688 | 456 | 664 | 840 | 664 |
| | 1000 | 992 | 648 | 808 | 888 | 656 | 416 | 528 | |

Figure 3C

| | 0 | 0 | 0 | 0 | 0 | 0 | 0 | 0 | L1 |
|---|---|---|---|---|---|---|---|---|---|
| 0 | 944 | 869 | 463 | 556 | 962 | 1482 | 1712 | 892 | 1712 |
| 0 | 890 | 913 | 1167 | 1252 | 811 | 633 | 262 | 266 | 262 |
| 0 | 989 | 1073 | 998 | 722 | 623 | 457 | 586 | 791 | 586 |
| 0 | 1019 | 905 | 590 | 808 | 804 | 632 | 498 | 605 | 498 |
| | 989 | 1073 | 998 | 722 | 623 | 457 | 586 | 791 | |

| | 0 | 0 | 0 | 0 | 0 | 0 | 0 | 0 | H1 |
|---|---|---|---|---|---|---|---|---|---|
| 0 | 64 | -44 | -452 | 336 | 584 | 200 | -320 | -496 | -320 |
| 0 | -24 | -48 | 32 | 32 | 164 | 124 | -104 | 64 | -104 |
| 0 | -52 | -172 | -104 | -120 | -136 | 104 | 80 | -4 | 80 |
| 0 | 128 | -176 | -128 | 120 | -200 | -200 | 248 | 312 | 248 |
| | -52 | -172 | -104 | -120 | -136 | 104 | 80 | -4 | |

Figure 4C

| | 0 | 0 | 0 | 0 | LL1 |
|---|---|---|---|---|---|
| 0 | 966 | 465 | 959 | 1543 | 959 |
| 0 | 861 | 1204 | 901 | 288 | 901 |
| 0 | 1009 | 996 | 564 | 600 | 564 |
| 0 | 1044 | 643 | 827 | 520 | 827 |
| | 1009 | 996 | 564 | 600 | |

| | 0 | 0 | 0 | 0 | LH1 |
|---|---|---|---|---|---|
| 0 | 166 | -157 | 145 | -820 | 145 |
| 0 | -116 | 263 | 97 | 6 | 97 |
| 0 | 80 | -89 | -148 | 205 | -148 |
| 0 | 101 | 111 | -19 | 107 | -19 |
| | 80 | -89 | -148 | 205 | |

| | 0 | 0 | 0 | 0 | HL1 |
|---|---|---|---|---|---|
| 0 | 102 | -347 | 669 | -347 | 669 |
| 0 | -37 | 3 | 171 | -39 | 171 |
| 0 | -76 | -128 | -103 | 92 | -103 |
| 0 | 84 | -101 | -185 | 208 | -185 |
| | -76 | -128 | -103 | 92 | |

| | 0 | 0 | 0 | 0 | HH1 |
|---|---|---|---|---|---|
| 0 | 150 | 270 | 68 | -176 | 68 |
| 0 | -52 | -66 | 94 | 168 | 94 |
| 0 | -94 | 0 | 132 | -84 | 132 |
| 0 | -176 | 284 | -224 | 64 | -224 |
| | -94 | 0 | 132 | -84 | |

Figure 5C

|   |   |   |   |   | L2 |
|---|---|---|---|---|---|
| 0 | 0 | 0 | 0 | 0 |   |
| 0 | 952 | 584 | 994 | 1347 | 994 |
| 0 | 984 | 1026 | 665 | 384 | 665 |
|   | 952 | 584 | 994 | 1347 |   |

|   |   |   |   |   | H2 |
|---|---|---|---|---|---|
| 0 | 0 | 0 | 0 | 0 |   |
| 0 | -137 | 474 | 140 | -784 | 140 |
| 0 | 35 | -353 | 263 | -80 | 263 |
|   | -137 | 474 | 140 | -784 |   |

| | 0 | 0 | 0 | 0 | 0 | 0 | 0 | 0 | L1R |
|---|---|---|---|---|---|---|---|---|---|
| 0 | 946 | 867 | 467 | 552 | 956 | 1492 | 1708 | 876 | 1708 |
| 0 | 893 | 912 | 1186 | 1258 | 818 | 635 | 260 | 260 | 260 |
| 0 | 983 | 1088 | 1000 | 720 | 632 | 450 | 588 | 780 | 588 |
| 0 | 1011 | 901 | 598 | 799 | 808 | 622 | 500 | 596 | 500 |
| | 983 | 1088 | 1000 | 720 | 632 | 450 | 588 | 780 | |

| | 0 | 0 | 0 | 0 | 0 | 0 | 0 | 0 | H1R |
|---|---|---|---|---|---|---|---|---|---|
| 0 | 56 | -40 | -456 | 324 | 592 | 200 | -320 | -512 | -320 |
| 0 | -16 | -56 | 32 | 28 | 152 | 124 | -96 | 64 | -96 |
| 0 | -40 | -168 | -104 | -116 | -128 | 108 | 88 | -8 | 88 |
| 0 | 144 | -180 | -120 | 124 | -208 | -196 | 264 | 328 | 264 |
| | -40 | -168 | -104 | -116 | -128 | 108 | 88 | -8 | |

Figure 13C

| | 0 | 0 | 0 | 0 | 0 | 0 | 0 | 0 | LLOR |
|---|---|---|---|---|---|---|---|---|---|
| 0 | 932 | 877 | 581 | 471 | 808 | 1442 | 1788 | 1004 | 1788 |
| 0 | 964 | 867 | 481 | 1145 | 1312 | 1198 | 756 | 176 | 756 |
| 0 | 883 | 936 | 1292 | 1170 | 632 | 554 | 364 | 372 | 364 |
| 0 | 924 | 984 | 1187 | 984 | 781 | 597 | 381 | 633 | 381 |
| 0 | 997 | 1144 | 1018 | 742 | 626 | 392 | 590 | 766 | 590 |
| 0 | 951 | 898 | 732 | 654 | 631 | 626 | 589 | 633 | 589 |
| 0 | 985 | 988 | 654 | 797 | 892 | 644 | 412 | 516 | 412 |
| 0 | 1129 | 808 | 534 | 921 | 684 | 448 | 676 | 844 | 676 |
| | 985 | 988 | 654 | 797 | 892 | 644 | 412 | 516 | |

| 117 | 110 | 73 | 59 | 101 | 180 | 224 | 126 |
|---|---|---|---|---|---|---|---|
| 121 | 108 | 60 | 143 | 164 | 150 | 95 | 22 |
| 110 | 117 | 162 | 146 | 79 | 69 | 46 | 47 |
| 116 | 123 | 148 | 123 | 98 | 75 | 48 | 79 |
| 125 | 143 | 127 | 93 | 78 | 49 | 74 | 96 |
| 119 | 112 | 92 | 82 | 79 | 78 | 74 | 79 |
| 123 | 124 | 82 | 100 | 112 | 81 | 52 | 65 |
| 141 | 101 | 67 | 115 | 86 | 56 | 85 | 106 |

| 1 | 0 | 1 | 0 | 1 | 1 | 0 | 1 |
|---|---|---|---|---|---|---|---|
| 0 | 0 | 1 | 1 | 1 | 1 | 0 | 3 |
| 0 | 0 | 3 | 1 | 1 | 0 | 0 | 0 |
| 1 | 0 | 1 | 0 | 0 | 0 | 1 | 1 |
| 1 | 2 | 0 | 0 | 1 | 1 | 0 | 1 |
| 0 | 1 | 1 | 0 | 2 | 1 | 1 | 2 |
| 2 | 0 | 1 | 1 | 1 | 1 | 0 | 1 |
| 0 | 1 | 2 | 1 | 0 | 1 | 2 | 1 |

ADAPTIVE PRECISION AND QUANTIFICATION OF A WAVELET TRANSFORMED MATRIX

CROSS REFERENCE TO RELATED APPLICATIONS

This application is a 371 of PCT/FR2015/000141 filed Jul. 9, 2015 which claims priority to the Foreign application FRANCE 14/01280 filed Jun. 4, 2014.

BACKGROUND OF THE INVENTION

Field of the Invention

The present invention relates to the field of the coding of matrices; it is in particular applicable to the coding of media, in particular image or video media, in the form of digital files. It relates more particularly to a method for reducing the entropy of these files, as defined by the Shannon formula, defined below.

Shannon entropy defines the "quantity" of information present in a signal, and therefore gives precise information of the quantity of bits necessary for coding this signal by means of binary coding techniques such as arithmetic coding or Huffman coding. The more repetitive and regularly distributed the values in the signal, the lower the entropy of this signal. The general formula for calculating entropy is as follows:

$$H(X) = H_2(X) = -\sum_{i=1}^{n} P_i \log_2 P_i.$$

where Pi represents the probability of appearance of each symbol.

As a result of this the way to reduce the weight (in number of bits) of a digital file is to reduce its entropy.

Wavelet transforms are used to reduce the weight of the digital files. This is in particular the case with certain digital image compression formats such as JPEG 2000.

Wavelet transformation of the matrix consists of dividing this matrix into a so-called approximation matrix or L matrix, and a so-called detail matrix or H matrix. Each of these matrices contains approximately half of the values of the original matrix. The approximation L matrix corresponds to a "reduced image" of the original matrix, and the detail H matrix corresponds to the details removed to reduce the size of the matrix.

In the context of two-dimensional wavelet transformations, it is possible to use the wavelet transformation horizontally or vertically. Usually, the transformation is carried out in one direction (for example vertically) in order to obtain an L-type approximation matrix and an H-type detail matrix, and then in the opposite direction (for example horizontally) on each of the L and H matrices. Applying this second transformation to the approximation L matrix generates an approximation LL matrix and a detail LH matrix. Applying this second transformation to the detail H matrix generates two detail HL and HH matrices. Wavelet levels will hereinafter mean the successive application of transformations in both directions in order to obtain an approximation LL matrix and three detail HL, LH and HH matrices as explained above.

In the use of wavelets for compressing the image in two dimensions, at the end of each level, the detail LH, HL and HH matrices are usually quantised in order to reduce the entropy, whereas a new level of wavelets can be applied to the LL matrix. It is thus possible to apply as many levels as necessary to the successive approximation LL matrices.

JPEG 2000 also uses dead zone scalar quantisation. Some wavelet transformations are lossless; however, applying a quantisation to each wavelet level leads to rounding errors that accumulate as the successive levels are passed through, first of at the time of compression, and then at the time of retrieval of the compressed digital files. This rounding problem is posed only when the detail LH, HL and HH matrices associated with the level are quantised.

BRIEF SUMMARY OF THE INVENTION

The aim of the invention is therefore to provide a method for reducing rounding errors in the compression of a digital file during the use of a wavelet transformation.

In the present text, for reasons of simplification, unless indicated to the contrary, numerical values are written to base 10, although the operations are designed to be performed on the binary values. When the values are written in base 2, they are clearly indicated as such; thus 1000 in base 2 would be denoted $(1000)_2$.

In the below disclosure, the term "fixed point" means "fixed decimal point" and the term "point" means "decimal point".

A method according to the invention for reducing the entropy of an original matrix is characterised in that:
   it comprises a step using a wavelet transformation of said original matrix into a transformed matrix;
   a quantisation coefficient corresponds to each detail matrix of each wavelet level;
   said wavelet transformation is calculated in fixed point using a first number of digits at least equal to 1 after the point, at least for each wavelet level for which at least one of the quantisation coefficients of the detail matrix is strictly greater than 1.

Preferably, the quantisation coefficient of each of the detailed submatrices of a wavelet level is less than or equal to that of the equivalent detail matrix of the previous level. It is also preferably a uniform scalar quantiser, that is to say unique for each detail matrix, whatever the value divided.

At the end of the processing of a wavelet level in fixed-point numbers, the values of the detail submatrices can be quantised according to each of their quantisation coefficients and then transformed into integer numbers, that is to say by abandoning the digits used for the fixed-point calculation. At the end of this processing of a wavelet level in fixed-point numbers, if a new wavelet level is applied to the approximation matrix, the values of said approximation matrix can be transformed into integer numbers if each of the quantisation coefficients of each of the detail matrices of the following wavelet level is equal to 1, and be kept in fixed-point numbers in the contrary case. At the end of the last level, the last approximation LL matrix is transformed into integer numbers if the last level is processed in fixed point.

If at least one of the quantisation coefficients of each of the detail matrices of the first level is greater than 1, all the values of the original matrix are advantageously transformed into fixed-point numbers before the calculation of the first wavelet transformation level.

If the original matrix processed results from a colorimetric transformation in fixed-point numbers with a precision greater than the first number of digits, the fixed-point numbers are preferably obtained by reducing the number of digits in order to obtain said first number.

In order to calculate a restored matrix from the transformed matrix, the method advantageously comprises an inverse wavelet transformation of the transformed matrix, said inverse wavelet transformation being carried out in fixed-point numbers using a second number of digits at least equal to 1 after the point, at least for each wavelet level for which at least one of the quantisation coefficients of the detail matrices of this level is strictly greater than 1.

During the inverse transformation of a wavelet level processed in fixed-point numbers, the values of the detail matrices can be converted into fixed-point numbers and dequantised before the inverse wavelet transformation. Likewise, if the approximation matrix of this level is in integer, it will be converted into fixed points before effecting the inverse wavelet level, which will give the restored approximation matrix that will be used at the following level.

The restored matrix is advantageously obtained by effecting the inverse wavelet transformations, the dequantisations and the conversions between integer and fixed-point numbers on all the available levels.

The intermediate restored matrix can advantageously be obtained by effecting the inverse wavelet transformations, the dequantisations and the conversions between integer and fixed-point numbers on a number of levels less than the total number of available levels. If the wavelet level corresponding to the last inverse wavelet transformation performed is processed in fixed-point numbers, the numbers of the intermediate restored matrix obtained are preferably the fixed-point numbers with a precision comprising a number of digits equal to the second number of digits after the point. For the subsequent processing of the intermediate restored matrix, each of the values of this restored matrix can be transformed into an integer number.

If not all the compressed data are available, it is possible to use the intermediate restored matrix with a number of levels corresponding to the levels where all the data are available. Likewise, for an application requiring a resolution lower than that of the restored matrix, it is possible to use the intermediate restored matrix with the smallest number of levels making it possible to achieve at least said lower resolution.

If the first wavelet level is processed in fixed-point numbers, the numbers of the restored matrix obtained may be fixed-point numbers with a precision comprising a number of digits equal to the second number of digits after the point.

For the subsequent processing of the matrix thus restored, each of the values of said restored matrix can be transformed into an integer number. The inverse wavelet transformation can be following by an inverse colorimetric transformation into fixed-point numbers with a number of digits greater than that used for the inverse wavelet transformation.

In order to carry out the fixed-point calculation, it is possible to shift to the left each value of the D digit matrix. Alternatively, it is possible to multiply each value of the matrix by 10, in base 2, raised to the power of D that is to say by: $(10^D)_2$.

When the fixed-point calculations have finished, preferably there is a shift to the right of each value of the matrix of the number D of digits and each value of the matrix is multiplied by 10, in base 2, raised to the power −D, that is to say by: $(10^{-D})_2$.

In order to restore the original matrix as a matrix restored from the transformed matrix, the inverse wavelet transformation is preferably in fixed point, using a second number of digits at least equal to 1 after the point, at least for each wavelet level having at least one detail matrix having a quantisation coefficient greater than 1. The first and second number of digits may be identical.

The original matrix may at least partially represent an image, for example represent one of the Y, Cb and Cr components of the image. Preferably, prior to the calculation of the wavelet transform, the first D digits resulting from the YCbCr transformation are preserved.

Advantageously, the YCbCr transformation can be done with a precision greater than D digits. In this case, the precision of the data is reduced so as to be reduced to D digits.

The wavelet transformation may be a Cohen-Daubechies-Feauveau (CDF) 5/3 transformation with lifting scheme.

BRIEF DESCRIPTION OF THE DRAWINGS

Several embodiments of the invention will be described below, by way of non-limitative examples, with reference to the accompanying drawings, in which:

FIG. 2A illustrates a matrix representing the image in FIG. 1, in which each cell contains a literal value for the luminance of the pixel, indexed by the position of the cell in the matrix;

FIG. 2B illustrates the same original matrix X, in which each cell contains an original numerical value, between 0 and 255, representing the luminance of a pixel corresponding to the original image;

FIGS. 2B, 3B, 4B, 5B, 6B; 7B, 8B, 9B, 10B, 11B, 12B, 13B and 14B illustrate a method of the prior art and FIGS. 2C, 3C, 4C, 5C, 6C; 7C, 8C, 9C, 10C, 11C, 12C, 12C, 13C, 14C and 15C illustrate a method according to invention;

FIGS. 3A and 3B illustrate respectively the submatrices of literal and numerical values at the end of a first step of calculating the first wavelet level, which consists of a vertical wavelet transformation applied to the values of the matrix in FIG. 2B in the method of the prior art;

FIGS. 4A and 4B illustrate respectively the submatrices of literal and numerical values obtained during a second step of calculating the first wavelet level, which consists of a horizontal wavelet transformation applied to the numerical values of each of the submatrices in FIG. 3B in the method the prior art;

FIGS. 5B and 6B illustrate the submatrices obtained respectively after a vertical wavelet transformation, and then a horizontal wavelet transformation, during the calculation of the second wavelet level in the method of the prior art;

FIG. 7B illustrates the quantisation of the submatrices and therefore represents all the submatrices at the end of the transformation according to the prior art;

FIG. 8B illustrate the concatenation of the values transformed and quantised by the prior art in a matrix of the same size as the original matrix;

FIG. 2C illustrates a prior step of shifting to the left of the values of the matrix in FIG. 2B, in a method according to the invention;

FIGS. 3A and 3C illustrate respectively the submatrices of literal and numerical values obtained during a first step of calculating the first wavelet level, consisting of a vertical wavelet transformation applied to the values of the original matrix X illustrated in FIG. 2B in a method according to the invention;

FIGS. 4A and 4C illustrate respectively the submatrices of literal and numerical values obtained during a second step of calculation of the first wavelet level, consisting of a horizontal wavelet transformation applied to the numerical values of the L1 and H1 submatrices illustrated in FIG. 3C in a method according to the invention;

FIGS. 5C and 6C illustrate respectively the submatrices obtained after the first step consisting of a vertical wavelet transformation and the second step consisting of a horizontal wavelet transformation, during the calculation of the second wavelet level in a method according to the invention;

FIG. 7C illustrates the quantisation of the transformed submatrices, and therefore represents all the submatrices at the end of the transformation in a method according to the invention;

FIG. 8C illustrates the concatenation of the transformed and quantised values in a method according to the invention in a matrix of the same size as the original matrix;

FIGS. 10B, 11B, 12B and 13B illustrated various steps for the retrieval of the XRZ matrix illustrating the restored brightnesses of the pixels of the image in FIG. 1;

FIGS. 10C, 11C, 12C, 13C and 14C illustrate various steps for retrieving the XR matrix illustrating the restored brightnesses of the pixels of the image in FIG. 1;

FIGS. 14B and 15B illustrate the error matrices respectively in the method of the prior art and in the method according to the invention; each cell of which comprises the difference between the restored value and the corresponding original value.

DETAILED DESCRIPTION OF THE PREFERRED EMBODIMENTS

Figure 1:
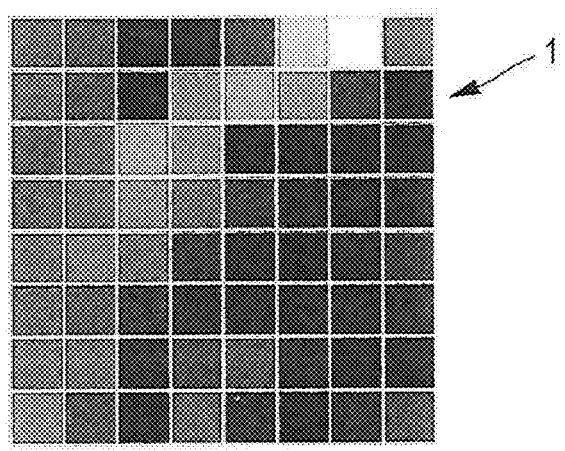
FIG. 1 illustrates an example of an original black and white image, forming a matrix of sixty-four pixels distributed in eight rows each of eight pixels.

The description of a method according to the invention according to the invention will be given in the field of the compression of digital images. Thus FIG. 1 illustrates an original black and white image corresponding to an image matrix of 8 rows and 8 columns.

FIG. 2A illustrates the X matrix representing the values of brightnesses of the pixels of the original image, each cell of the matrix disposed at the intersection of a horizontal line i (hereinafter row) and a vertical line j (hereinafter column) comprises a literal value xij representing the luminance of a pixel situated, in the original image, on the same row i and the same column j.

FIG. 2B illustrates the same X matrix, in which each literal value has been replaced by the corresponding numerical value for the original image 1. These values are coded in non-signed integers in 8 bits, that is to say between 0 and 255. By way of example, the value of the darkest pixel is $x_{28}=25$ and that of the brightest is $x_{17}=224$. Applying the entropy calculation formula gives an entropy of 5.625 for this matrix.

The wavelet transformation used in the examples that follow is a Cohen-Daubechies-Feauveau (CDF) 5/3 transformation with lifting scheme. This differs from the wavelets used in JPEG 2000, that is to say lossless CDF 5/3 and lossy CDF9/7, only through the number of adjacent values used for the details and the associated factors.

The CDF 5/3 wavelets can be applied to a Y matrix, the values of which indexed as defined above.

A vertical wavelet step if obtained with the following equations:

Calculation of the Detailed Matrix:

$$h_{m,n}=y_{2m,n}-[y_{2m-1,n}+y_{2m+1,n}]/2$$

for any m between 1 and half the height of Y, for any n on the width of Y. For example, the H1Z matrix is obtained from origin X (see FIG. 3B).

Calculation of the Approximation Matrix:

$$l_{mn}=y_{2m-1,n}+[h_{m-1,n}+h_{m,n}]/4$$

for m less than or equal to half the height of Y, +1 if the height of Y is odd, for any n on the width of Y. By way of example, the L1Z matrix is obtained from the original X and H1Z matrices (see FIG. 3B).

A horizontal wavelet step is obtained with the following equations:

Calculation of the Detail Matrix:

$$h_{m,n}=y_{m,2n}-[y_{m,2n-1}+y_{m,2n+1}]/2$$

for any n between 1 and half the height of Y, for any m on the height of Y. By way of example, HH1Z is obtained from H1Z. and LH1Z from L1Z.

Calculation of the Approximation Matrix:

$$l_{mn}=y_{m,2n-1}+[h_{m,n-1}+h_{m,n}]/4$$

for n less than or equal to half to the width of Y, +1 if the width of Y is odd, for any m on the height of Y. By way of example, HL1Z is obtained from H1Z and HH1Z, and LL1Z is obtained from L1Z and LH1Z.

Each value is routinely rounded to the integer at the end of a calculation. In the following examples, the following rule was adopted for the roundings: rounding according to the rule defined above, 0.5 being rounded to 1 and −0.5 to −1. Thus 2.49 will be rounded to 2, 2.5 to 3 and 2.3 to 2.

In order to make it possible to calculate certain rows and columns at the edge of the matrices, virtual values that are not processed in themselves but make it possible to process the others are added in accordance with the following rules:

The virtual values situated just above and just to the left of each of the matrices and of each of the restored matrices are nil. Thus the detail matrix H1Z illustrated in FIG. 3B may have among its virtual values $H1Z_{01}=0$ or $H1Z_{08}=0$. In the same way, the restored detail matrix H1RZ illustrated in FIG. 12B will have among its virtual values $H1Z_{01}=0$ or $H1RZ_{08}=0$, the detail matrix LH1Z will have among its virtual values $LH1Z_{10}=0$ or $LH1Z_{40}=0$, and the restored detail matrix LH1RZ will have among its virtual values $LH1RZ_{10}=0$ or $LH1Z_{40}=0$.

the virtual values situated just to the right and just below each of the matrices and of each of the restored matrices are respectively equal to the value situated two cells to the left and two cells above. Thus there will be among the virtual values of X $x_{91}$-$x_{71}$ among those of L1Z, $L1Z_{19}=L1Z_{17}$, among those of L1RZ, $L1Z_{19}=L1Z_{17}$, among those of L1RZ, $L1RZ_{19}=L1RZ_{17}$ and among those of LL1RZ, $LL1RZ_{51}=LL1RZ_{31}$.

In the examples illustrated, there is applied to each submatrix generated at wavelet level N a respective quantisation factor Q which, in this example, will be the same for each of the detail matrices of the same level:

for the first level N=N1−1, $Q=Q1=Q_{LH1}=Q_{HL1}=Q_{HH1}=4$;
for the second level N=N2=2, $Q=Q2=Q_{LH2}=Q_{HL2}=Q_{HH2}=2$ FIGS. 3B and 4B illustrate the application of the first wave level N1 to the original matrix X, according to the method of the prior art, before application of the quantisation factors.

Thus the submatrices L1Z and H1Z illustrated in FIG. 3B, each of four rows of H pixels, illustrated in FIGS. 3A and 3B, are obtained by applying vertical wavelets to the original matrix X.

Thus the transformation of the first pixels x11 and x21 of the first two rows is done in accordance with the following calculation:

The corresponding value of the detail submatrix H1Z is:

$$H1Z_{11}=x_{21}-(x11+x31)/2=121-(116+110)/2=8$$

The corresponding value of the approximation submatrix L1Z is:

$$L1Z_{11}=x_n+(H1Z_{01}+H1Z_{11})/4=116+(0+8)/4=118$$

The transformation of the first pixels x31 and x41 of the following two rows is done in accordance with the following calculation:

The corresponding value of the submatrix H1Z is:

$$H1Z_{21}=x41-(x_{31}+X_{51}/2=115-(110+126)/2=-3$$

The corresponding value of the submatrix L1Z is:

$$L1Z_{21}=x_{31}+(H1Z_{11}+H1Z_{21})/4=110+(8+(-3))/4=111$$

Horizontal wavelets are next applied to each of the submatrices L1Z and H1Z so that there are obtained respectively, as illustrated in FIG. 4B:
- for the submatrix L1Z, two new submatrices LL1Z and LH1Z; and
- for the submatrix H1Z, two new submatrices HL1Z and HH1Z.

FIG. 5B illustrates the result of the application of a first step of a second level N2 of wavelets to the submatrix LL1Z obtained previously; the result is two submatrices L2Z and H2Z. FIG. 6B illustrates the result of the application of a second step of the second wavelet level to the matrices L2Z and H2Z; the result is the submatrices LL2Z, LH2Z, HL2Z and HH2Z in FIG. 6B.

It is then possible either to re-do a level, or to keep the matrix LL2Z, or to quantise it.

It is chosen here to keep the matrix LL2Z identical without applying a third wavelet level.

The submatrix LL2Z will therefore be kept as such, will not be the subject of a new wavelet level and will be stored in the form of a matrix LL2QZ having identical values.

Next the respective quantisations are applied for each level. Thus the quantised submatrices LH1QZ, HL1QZ and HH1QZ are obtained by dividing respectively each of the values of the submatrices LH1Z and HL1Z by their quantisation factors $Q_{LH1}$, $Q_{HL1}$ and $Q_{HH1}$, equal to the factor Q1 of the first level N1, and taking the rounding thereof in accordance with rule defined above. Likewise, the quantised submatrices LHQ2Z, HLQ2Z and HH2QZ are obtained by dividing respectively each of the values of the submatrices LH2Z, HL2Z and HH2Z by their quantisation factors $Q_{LH2Z}$, $Q_{HL2Z}$ and $Q_{HH2Z}$, equal to the factor Q2 of the second level N2, and taking the rounding in accordance with the rule defined above. All these quantised matrices are illustrated in FIG. 7B.

The transform TZ of the matrix X by the method of the prior art is obtained by transforming the values of the original matrix X into values of the submatrices LL2QZ, LH2QZ, HL2QZ, HH2QZ, LH1QZ, HL1QZ and HH1QZ. These new values can be stored in specific locations. They can also be substituted for the values of the matrix X in order to form a matrix of the same size. FIG. 8B illustrates an example of such a placing of values.

Reducing the number of different values in this transformed matrix compared with the original matrix makes it possible to increase the probability of appearance of each of them. The Shannon entropy according to the previous formula of this new matrix is therefore lower that of the original matrix: it is 4.641.

A method according to the invention will now be described.

A method according to the invention consists of keeping, during the calculation of a wavelet transform, D digits after the point (in binary notation), that is to say D negative powers of two. To make the calculation quicker, rather than carrying it out in floating point, it is carried out in fixed point. To do this, it is possible to multiply each value of the original matrix X by a shift coefficient equal to $2^D$, that is to say by $(10^D)_2$. It is also possible to shift the values, denoted in binary, by D digits to the left. Next only the integer part of the increased values thus obtained is kept, so that the numbers manipulated are integers the last D digits of which represent the D negative powers of two and the other digits represent the integer part of the original number.

In the example illustrated, three digits are kept. The matrix XD of the increased values is illustrated in FIG. 2C. Each of the values $XD_{ij}$ of the matrix XD is therefore eight times greater than the values $X_{ij}$ of the original matrix X:

$$XDij=8 \times Xij$$

The binary values used in the computer calculation have therefore been multiplied by $(1000)_2$, that is to say the shift coefficient is equal to 8.

By the same transformation used previously to obtain the transformed matrix TZ, there are obtained, from the augmented matrix XD, by a first application first of all of vertical wavelets, the submatrices L1 and H1 illustrated in FIG. 3C, and then of horizontal wavelets the submatrices LL1, LH1, HL1 and HH1, illustrated in FIG. 4C. Next, there are obtained, by a second application to the submatrix LL1 of wavelets, first of all vertical, the submatrices L2 and H2 illustrated in FIG. 5C, and then horizontal, the submatrices LL1, LH2, HL2 and HH2, illustrated in FIG. 6C.

The respective quantisations are next applied for each level and the values obtained are divided by 8. Alternatively it is possible to shift by three digits to the right the binary values obtained after division by the respective quantisation factor.

Figures 5C, 6C, 7C, 8C:
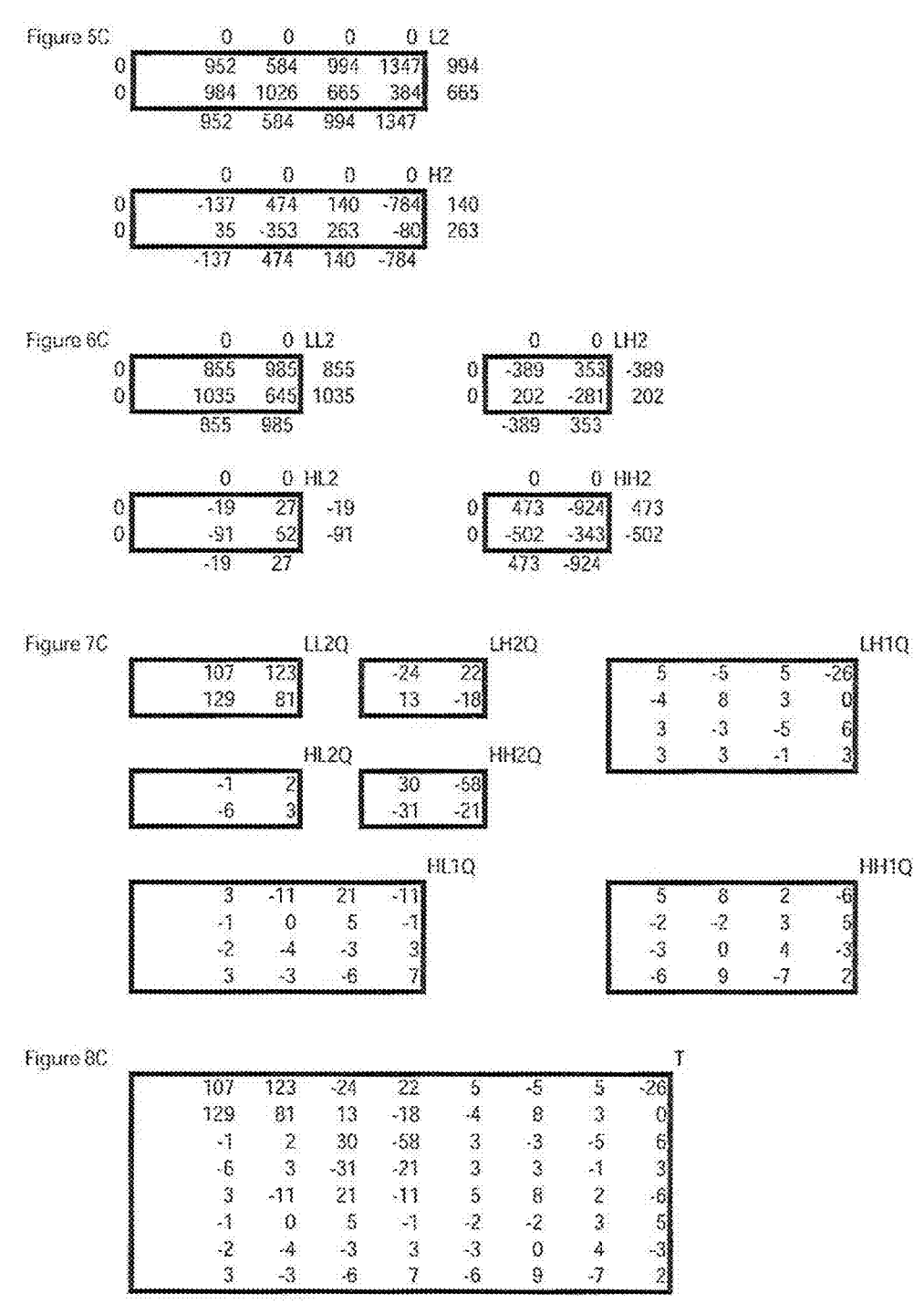

Thus the quantised submatrices LH1Q, HL1Q and HH1Q illustrated in FIG. 7C are obtained by dividing respectively each of the values of the submatrices LH1, HL1 and HH1 by 8 times their quantisation factors $Q_{LH1}$, $Q_{HL1}$ and $QHH_1$, that is to say for each matrix 8×Q1 and taking the rounding according to the rule defined above. Likewise, the quantised submatrices LH2Q, HL2Q and HH2Q illustrated in FIG. 7C are obtained by dividing respectively each of the values of the submatrices LH2, HL2 and HH2 by 8 times their quantisation factors $Q_{LH2}$, $Q_{HL2}$ and $Q_{HH2}$, that is to say for each matrix 8×Q2, and taking the rounding according to the rule defined above. Finally, the submatrix LL2Q illustrated in FIG. 7C is obtained by retransforming the matrix LL2 entirely, therefore by dividing the values of the matrix LL2 by 8 and taking the rounding according to the rule defined above. All these transformed matrices are illustrated in FIG. 7C.

The transformation T of the matrix by the method according to the invention is obtained by transforming the values of the original matrix X into values of the submatrices LL2Q, LH2Q, HL2Q, HH2Q, LH1Q, HL1Q and HH1Q. These new values can be stored in specific locations. They can also be substituted for the values of the matrix X in order to form a matrix of the same size. FIG. 8C illustrates an example of such a placement of values.

Reducing the number of different values in this transformed matrix compared with the original matrix there also makes it possible to reduce the Shannon entropy. According to the formula given above, the Shannon entropy of this new transformed matrix is 4.520.

The restoration steps will now be described, that is to say the process of obtaining the restored matrix XR representing the restored version of the image, first of all according to the method of the invention and then according to the method of the prior art.

Figures 9B, 10B, 11B:
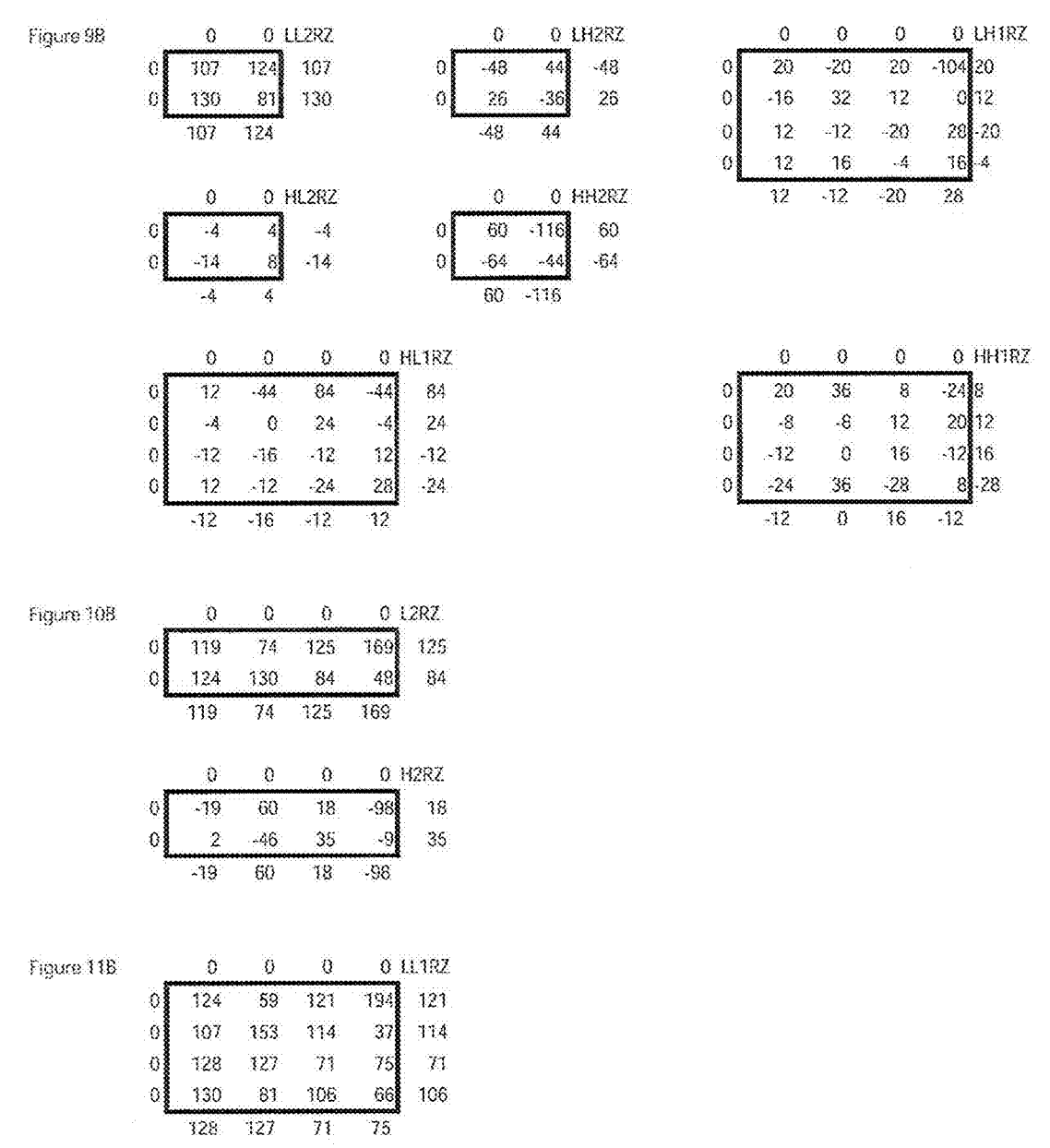
Figures 9C, 10C, 11C:
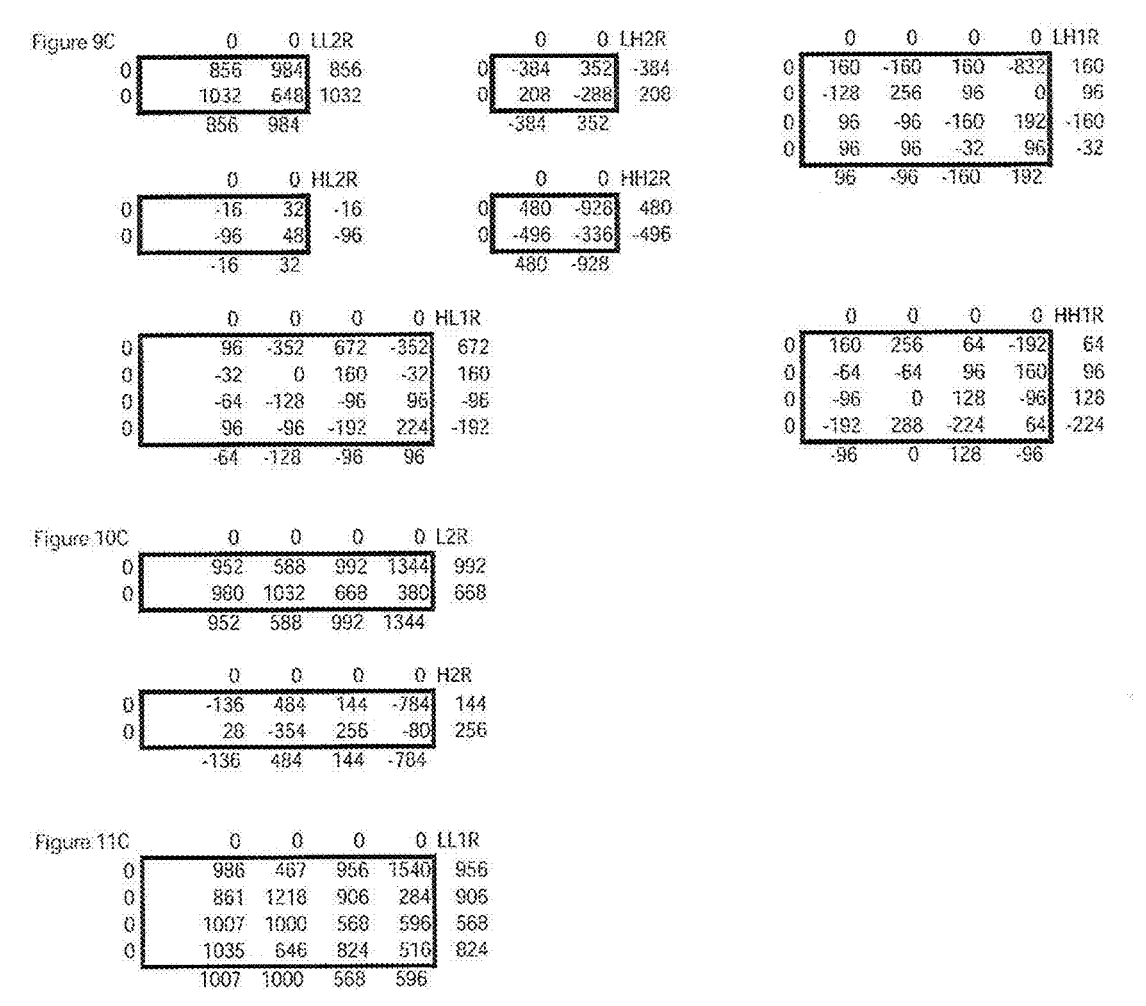

First of all dequantised detail matrices are calculated, from quantised detail matrices, by multiplying their values by their respective quantisation coefficient, and then by eight, in order to obtain the same precision level as during the wavelet transformation. Thus the submatrices illustrated in FIG. 9C are obtained:
  LL2R, the values of which are equal to those of the submatrix LL2Q multiplied by 8;
  LH2R, HL2R and HH2R, the values of which are respectively equal to those of the submatrices LH2Q, HL2Q and HH2Q multiplied by $8 \times Q_{LH2}$, $8 \times Q_{HL2}$, and $8 \times Q_{HH2}$, i.e. $8 \times Q_2$, that is to say simply by 16, each of the level 2 quantisation factors being equal to Q2, that is to say 2; and
  LH1R, HL1R and HH1R, the values of which are respectively equal to those of the submatrices LH1Q, HL1Q and HH1Q multiplied by $8 \times Q_{LH1}$, $8 \times Q_{HL1}$, and $8 \times Q_{HH2}$, i.e. $8 \times Q1$, that is to say simply by 32, each of the level 1 quantisation factors being equal to Q1, that is to say 4.

Next the level 2 inverse wavelets are applied to the submatrices LL2R, LH2R, HL2R and HH2R in order to obtain the submatrix LL1R illustrated in FIG. 11C.

Next the level 1 inverse wavelets are applied to the submatrices LL1R, LH1R, HL1R and HH1R in order to obtain the matrix LL0R illustrated in FIG. 13C, the values LL0Rij of this matrix being rounded in accordance with the rule defined above.

Next each of the values LL0Rij of the matrix LL0R are divided by 8, or the corresponding binary values are shifted by 3 digits to the right, and each of the values XRij thus obtained are rounded in accordance with the rule defined above. In this way the restored matrix XR of the values XRij illustrated in FIG. 14C is obtained. Each value XRij represents the luminance of a pixel of a restored image, restored by a method according to the invention, of the original image.

Each value Eij of the matrix E shown in FIG. 15C represents the differences between the values XRij of the restored matrix XR and the values Xij of the original matrix. The average of these differences, in the example illustrated, is approximately 0.78.

It is also possible to only partially restore the image, by effecting only part of the inverse wavelet transformation level. It is possible for example to restore only a quarter of the image using an intermediate restored matrix. Such a matrix of size 4×4 can be obtained by dividing each of the values LL1RIij of the matrix LL1R illustrated in FIG. 11C by 8, or by shifting these binary values by 3 digits to the right. The intermediate restored matrix thus obtained corresponds to a reduced restored image.

This possibility of gradual decompression, referred to as scalability, makes it possible to have an idea of the image when not all the data are available. This can advantageously be used during the downloading of a heavy image file, in order to decompress the image as far as the last fully available level before the complete arrival of the image.

This can also make it possible to decompress the image only at the necessary resolution, for example to display an image in a gallery. Partial decompression then saves on resources by avoiding unnecessary decompression levels.

A description will now be given of the steps of restoring the image, from the transformed matrix TZ, in the method of the prior art.

First of all the dequantised detail matrices are calculated, from the quantised detail matrices, by multiplying their values by their respective quantisation coefficient. In this way the submatrices illustrated in FIG. 9B are obtained:
  LL2RZ, the values of which are equal to those of the submatrix LL2QZ, this matrix not having been modified by a wavelet level;
  LH2RZ, HL2RZ and HH2RZ, the values of which are respectively equal to those of the submatrices LH2QZ, HL2QZ and HH2QZ, multiplied by their quantisation factors $Q_{LH2}$, $Q_{HL2}$ and $Q_{HH2}$, i.e. for each matrix Q2, that is to say by 2, the level 2 quantisation factor Q2 being equal to 2; and
  LH1RZ, HL1RZ and HH1RZ, the values of which are respectively equal to those of the submatrices LH1QZ, HL1QZ and HH1QZ, multiplied by their quantisation factors $Q_{LH1}$, $Q_{HL1}$ and $Q_{HH1}$, i.e. for each matrix Q1, that is to say by 4, the level 1 quantisation factor Q1 being equal to 4.

Next the level 2 inverse wavelets are applied to the submatrices LL2RZ, LH2RZ, HL2RZ and HH2RZ in order to obtain, at the end of a horizontal inverse wavelet transformation, the submatrices L2RZ and H2RZ illustrated in FIG. 10B, and then, at the end of a vertical inverse wavelet transformation of the submatrices L2RZ and H2RZ, the submatrix LL1RZ illustrated in FIG. 11B.

Next the level 1 inverse wavelets are applied to the submatrices LL1RZ, LH1RZ, HL1RZ and HH1RZ in order to obtain, at the end of a horizontal inverse wavelet transformation, the submatrices L1RZ and H1RZ illustrated in FIG. 12B, and then, at the end of a vertical inverse wavelet transformation of the submatrices L1RZ and H1RZ, the restored matrix XRZ illustrated in FIG. 13, the values XRZij of this matrix being rounded in accordance with the rule defined above. Each value XRZij represents the luminance of the pixel of a restored image, restored in accordance with the method of the prior art, of the original image.

Each value EZij of the matrix EZ, shown in FIG. 14B, represents the differences between the values XRZij of the restored matrix XRZ and the values Xij of the original matrix X. The average of these differences, in the example illustrated, is approximately 1.56. Thus it is found that, for the example illustrated, the differences obtained by the method of the prior art are approximately twice as great as those obtained by a method according to the invention (0.78).

At the same time, it is found that the entropy of the matrix T transformed according to the invention (4.520) is slightly less than that of the matrix TZ transformed according to the prior art (4.641) and significantly less than that of the original matrix (5.625).

A method according to the invention therefore makes it possible to reduce the entropy of a matrix while obtaining a more exact retrieval of the values of the matrix than by entropy reduction methods used in the prior art.

Naturally, the invention is not limited to the examples that have just been described. Thus the black and white image may be an illustration of an R, G, or B component of an RGB image. Each component Y, Cb or Cr, of an RGB image that has undergone a YCbCr transformation, and mainly the luma component Y, can also be processed in the same way as the black and white image in the example described above. It may more generally represent any component of an image, which may also result from a CMYK space, or any colorimetric transformation obtained from the RGB components, with or without loss.

In addition, if the wavelets were first of all applied vertically for each level, it is also possible to apply them, for each level, first of all horizontally and then vertically.

It is also possible for the number of additional digits, that is to say the number of negative powers of two used in the fixed-point calculation, to be different, in the calculation of the values Tij of the transform T, from the one used for restoring the values XRij from the transform.

Preferably, the number of digits will be greater if the number of wavelet levels is greater.

In the example illustrated, each of the values of the detail matrices was simultaneously quantised and divided by the shift coefficient; on the other hand, the quantisation cannot be done simultaneously with the division by the shift coefficient. Furthermore, the quantisation and/or the division by the shift coefficient can be done each time a corresponding submatrix is obtained.

In the example illustrated, the calculation precision was superior to the precision of the input data, which were integer numbers. In the case where the input data have a precision superior to the calculation precision, in particular if they result from a colorimetric transformation having a calculation precision superior to that of the wavelets, the matrix XD is obtained by reducing the number of negative powers of two rather than by increasing it.

In the same way, on decompression, if the data have to be processed at the output with a precision superior to that of the inverse wavelet transform, for example for colorimetric transformation, the precision of the data may be directly increased so as to be identical to that of the subsequent transformation.

Naturally the invention can also apply to matrices with one or more dimensions. In this case, a wavelet level is obtained by a series of transformations on each of the dimensions.

The invention claimed is:
1. A method for compressing a digital image, comprising:
a step for reducing an entropy of a component of said image, represented in a form of an original matrix (X), wherein:
said original matrix is transformed into a transformed matrix (T) using a wavelet transformation;
a respective quantisation coefficient corresponds to each detail matrix for each of plural detail matrices;
said wavelet transformation is calculated in fixed decimal point using a first number (D) of digits, wherein D≥1, after the decimal point, for each wavelet level for which at least one of the quantisation coefficients corresponding to each of the detail matrices is strictly greater than 1, and
at the end of the processing of a wavelet level in fixed-decimal point numbers, values of an approximation matrix are transformed into integer numbers when each of the quantisation coefficients of each of the detail matrices of a subsequent wavelet level is equal to 1, and are kept in fixed-decimal point numbers in the contrary case.

2. The method according to claim 1, wherein each of the quantisation coefficients of the detail matrices of each of the wavelet levels in a current wavelet level is less than or equal to the coefficient of the equivalent matrix of a wavelet level immediately prior to the current wavelet level, but always greater than or equal to 1.

3. The method according to claim 1, wherein, at the end of the processing of a wavelet level in fixed-decimal point numbers, the values of the detail matrices are quantised in accordance with said quantisation coefficient associated with said detail matrix and then transformed into integer numbers, that is to say by abandoning the D digits used for the fixed-decimal point calculation.

4. The method according to claim 3, wherein the quantisation coefficient is unique for each matrix whatever the value quantised.

5. The method according to claim 1, wherein, when at least one of the quantisation coefficients of the detail matrices of a first wavelet level is greater than 1, all the values of the original matrix (X) are transformed into fixed-decimal point numbers before the calculation of the first wavelet level.

6. The method according to claim 5, wherein, when a processed matrix results from a colorimetric transformation into fixed-decimal point numbers with a precision greater than the first number of digits (D), the fixed-decimal point numbers are obtained by reducing a total number of digits in order to obtain said first number of digits (D).

7. The method according to claim 1, further comprising, in order to calculate a restored matrix (XR), or an intermediate restored matrix, from the transformed matrix (T), the method comprises an inverse wavelet transformation of said transformed matrix (T), a calculation of said inverse wavelet transformation being effected in fixed-decimal point numbers using a second number of digits at least equal to 1 after the decimal point, at least for each wavelet level for which at least one of the quantisation coefficients of each of the detail matrices is strictly greater than 1.

8. The method according to claim 7, wherein, during the inverse transformation of said transformed matrix (T) of a wavelet level processed in fixed-decimal point numbers, the values of a matrix to which the inverse transformation is applied are converted into fixed-decimal point numbers, when the values of said matrix are initially integer numbers.

9. The method according to claim 7, wherein, during the inverse transformation of said transformed matrix (T) of a wavelet level processed in fixed-decimal point numbers, the values of the detail matrices are converted into fixed-decimal point numbers and dequantised before the inverse wavelet transformation.

10. The method according to claim 7, wherein the restored matrix (XR) is obtained by effecting the inverse wavelet transformation, dequantisations and conversions between integer numbers and fixed decimal points on all the available wavelet levels.

11. The method according to claim 7, wherein, when a first wavelet level is processed in fixed-decimal point numbers, the numbers of the restored matrix (XR) obtained are fixed-decimal point numbers with a precision comprising a number of digits equal to the second number of digits after the decimal point.

12. The method according to claim 11, wherein, for a subsequent treatment of the restored matrix (XR), each of the values of said restored matrix is transformed into integer numbers.

13. The method according to claim 7, wherein the intermediate restored matrix is obtained by effecting the inverse wavelet transformation, the dequantisations and the conversions between integer numbers and fixed decimal points on a number of wavelet levels less than a total number of available wavelet levels.

14. The method according to claim 13, wherein, when the wavelet level corresponding to a last inverse wavelet transformation formed is processed in fixed-decimal point numbers, the numbers of the intermediate restored matrix obtained are fixed-decimal point numbers with a precision comprising a number of digits equal to the second number of digits after the decimal point.

15. The method according to claim 14, wherein, for a subsequent processing of the intermediate restored matrix, each of the values of said restored matrix is transformed into integer numbers.

16. The method according to claim 13, wherein, when not all compressed data are available, the intermediate restored matrix is used with a number of wavelet levels corresponding to the wavelet levels for which all data are available.

17. The method according to claim 13, wherein, for an application requiring a resolution lower than that of the restored matrix (XR), use is made of the intermediate restored matrix with a smallest number of wavelet levels making it possible to achieve at least said lower resolution.

18. The method according to claim 7, wherein, when the inverse wavelet transformation is followed by an inverse colorimetric transformation in fixed-decimal point numbers with a number of digits greater than that used for the inverse wavelet transformation, the values of the restored matrix are directly converted into fixed-decimal point numbers with a precision of the inverse colorimetric transformation.

19. The method according to claim 1, wherein, in order to carry out the fixed-decimal point calculation of the wavelet transformation, each value of the approximation matrix of the first number (D) of digits is shifted towards the left.

20. The method according to claim 1, wherein, in order to perform the fixed-decimal point calculation of the wavelet transformation, each value of the approximation matrix is multiplied by 10, in base 2, raised to the power of D, that is to say by: $(10^D)_2$.

21. The method according to claim 1, wherein, when the fixed-decimal point calculations of the wavelet transformation have been finished, each value of the approximation matrix of the first number (D) of digits is shifted to the right.

22. The method according to claim 1, wherein, when the fixed-decimal point calculations of the wavelet transformation have been finished, each value of the approximation matrix is multiplied by 10, in base 2, raised to the power of −D, that is to say by: $(10^{-D})_2$.

23. The method according to claim 7, wherein the first number (D) and second number of digits are identical.

24. The method according to claim 1, wherein the original matrix at least partially represents an image.

25. The method according to claim 1, wherein the original matrix represents one of the Y, Cb and Cr components of the image.

26. The method according to claim 1, wherein the wavelet transformation is a Cohen-Daubechies-Feauveau (CDF) 5/3 transform with lifting scheme.

* * * * *